(12) United States Patent
Kozlowski et al.

(10) Patent No.: US 11,048,551 B2
(45) Date of Patent: Jun. 29, 2021

(54) SECURE DELIVERY AND DEPLOYMENT OF A VIRTUAL ENVIRONMENT

(71) Applicant: Dell Products, L.P., Round Rock, TX (US)

(72) Inventors: Joseph Kozlowski, Hutto, TX (US); Ricardo L. Martinez, Leander, TX (US); Abeye Teshome, Austin, TX (US); Charles D. Robison, Buford, GA (US); Girish S. Dhoble, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 632 days.

(21) Appl. No.: 15/962,275

(22) Filed: Apr. 25, 2018

(65) Prior Publication Data
US 2019/0332421 A1 Oct. 31, 2019

(51) Int. Cl.
*G06F 9/48* (2006.01)
*H04L 29/06* (2006.01)
*H04L 9/32* (2006.01)
*G06F 9/455* (2018.01)
*H04L 9/08* (2006.01)

(52) U.S. Cl.
CPC ........ *G06F 9/4856* (2013.01); *G06F 9/45558* (2013.01); *H04L 9/0825* (2013.01); *H04L 9/3247* (2013.01); *H04L 63/06* (2013.01); *H04L 63/12* (2013.01); *H04L 63/18* (2013.01);
(Continued)

(58) Field of Classification Search
CPC ............... G06F 9/4856; G06F 9/45558; G06F 2009/45595; G06F 2009/4557; G06F 9/5077; G06F 21/6209; G06F 21/53; G06F 9/4401; G06F 2009/45579; H04L 63/18; H04L 63/12; H04L 63/06; H04L 9/3247; H04L 9/0825; H04L 9/0894; H04L 9/3215; H04L 63/123; H04L 63/061
See application file for complete search history.

(56) References Cited

U.S. PATENT DOCUMENTS

8,649,733 B2 * 2/2014 Qi ..................... H04L 63/0869
                                                    455/41.2
8,924,720 B2 * 12/2014 Raghuram ............ H04L 63/062
                                                    713/167
(Continued)

*Primary Examiner* — Christopher A Revak
(74) *Attorney, Agent, or Firm* — Fogarty LLP (57) ABSTRACT

A secured container provides access to enterprise data while isolated from the operating system of an Information Handling System (IHS). The secured container remains secured during its delivery and deployment. A secured container is configured to provide a user of the IHS with access to enterprise data. The secured container is encrypted using a symmetrical key that is transmitted to a secured storage that is isolated from the operating system of the IHS via out-of-band communications. The encrypted secured container is digitally signed using an asymmetric key pair. The digital signature and the encrypted secured container are transmitted to the IHS via in-band communications. At the IHS, the public key of the asymmetric key pair is used to validate the digital signature and the private symmetric key is retrieved from secured storage to decrypt the secured container. Additional embodiments provide a technique for securely migrating a secured container between IHSs.

5 Claims, 4 Drawing Sheets

(52) U.S. Cl.
  CPC .............. *G06F 2009/4557* (2013.01); *G06F 2009/45595* (2013.01)

(56) References Cited

U.S. PATENT DOCUMENTS

| | | | | |
|---|---|---|---|---|
| 9,858,104 B2* | 1/2018 | Tripathi | .............. | H04L 41/0893 |
| 2006/0129769 A1* | 6/2006 | Chen | .................... | G06F 3/0647 |
| | | | | 711/162 |
| 2011/0099548 A1* | 4/2011 | Shen | .................. | G06F 9/45558 |
| | | | | 718/1 |
| 2013/0097296 A1* | 4/2013 | Gehrmann | ............ | G06F 9/4856 |
| | | | | 709/223 |
| 2015/0212948 A1* | 7/2015 | Tsirkin | ................ | G06F 9/45558 |
| | | | | 711/6 |
| 2015/0256391 A1* | 9/2015 | Hardy | .................. | H04W 12/35 |
| | | | | 709/222 |
| 2018/0183580 A1* | 6/2018 | Scarlata | ............... | G06F 9/4856 |

* cited by examiner

SECURE DELIVERY AND DEPLOYMENT OF A VIRTUAL ENVIRONMENT

FIELD

This disclosure relates generally to Information Handling Systems (IHSs), and, more specifically, to security for virtual environments utilized by IHSs.

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An enterprise may employ a wide variety of IHSs within an enterprise system. An enterprise system utilizes IHSs to provide employees with access to the tools and business data required to perform their job functions. An enterprise system is required to support employee productivity, while also placing paramount importance on protecting business data, both from loss and misuse. The difficulty of supporting employee productivity while protecting business data has been greatly compounded by the advent of the modern workplace settings in which employees may expect to access business data from a variety of different locations and are not restricted to the use of a single IHS.

One of the difficulties in securing a modern enterprise system is detecting and mitigating the effects of an employee accessing business data from an IHS that has been compromised. Malicious software, such as computer viruses, may be surreptitiously or unintentionally installed on an IHS utilized by an employee. One tactic employed by such malicious software programs is to appropriate data that is stored by an IHS. Such data thefts may provide malicious actors with valuable financial information and information that may be used in identity thefts. Another tactic employed by malicious actors is the use ransomware that infects an IHS and encrypts data stored by the IHS. The malicious actor may then extort a ransom in order for the owner of the IHS to regain access to the encrypted data.

One of the more vulnerable components of an IHS is the operating system. Each of the software applications, network connections and peripherals supported by the operating system provides an avenue by which the IHS may be compromised. The more such features supported by an operating system, the more potential attack surfaces by which the operating system may be compromised. Compounding this difficulty of safeguarding the operating system is the need for most operating systems to support operations that are difficult to secure, such as web transactions and email. Isolation of enterprise data from the operating system protects the enterprise data from some of the risks of a compromised operating system.

SUMMARY

Various embodiments provide methods for delivering and deploying a secured container on an Information Handling System, where the methods include: receiving a request to host the secured container on the IHS for a first user; configuring the secured container according to policies applicable to the first user and the IHS; encrypting the secured container using a symmetric key; transmitting the symmetric key for storage to a secured storage on the IHS, wherein the symmetric key is transmitted via out-of-band communications to a trusted resource on the IHS and wherein the secured storage is isolated from the operating system of the IHS; digitally signing the encrypted secured container using an asymmetric key pair; and transmitting the digital signature and the encrypted secured container to the IHS via in-band communications.

In certain additional embodiments of the method, the out-of-band communications are isolated from the operating system of the IHS and the in-band communications are supported by the operating system of the IHS. In certain additional embodiments of the method, the trusted resource is an embedded controller installed in the IHS. In certain additional embodiments of the method, the embedded controller is a BIOS controller installed on the IHS and the trusted resource is a computing environment operating on the BIOS controller. In certain additional embodiments, the method further comprises, transmitting a public key of the asymmetric key pair to the IHS via the in-band communications. In certain additional embodiments of the method, the in-band communications with the IHS are supported via a trusted agent running within the operating system of the IHS; wherein the trusted agent supports in-band encrypted communications with the deployed secured container.

Various additional embodiments provide an Information Handling System (IHS), including one or more processors and a trusted resource configured to: receive a symmetric key via out-of-band communications; store the symmetric key to a secured storage that is isolated from the operating system of the IHS; and provide access to the symmetric key in the secured storage to a trusted agent operating within the operating system of the IHS. The IHS further includes a system memory coupled to the one or more processors, the system memory including program instructions stored thereon that, upon execution by the one or more processors, cause the IHS to: initialize the trusted agent; receive, via in-band communications, a secured container that is digitally signed and encrypted; verify the authenticity of the digital signature using a public validation key; decrypt the secured container using the symmetric key accessed by the trusted agent; and launch the secured container.

In certain additional embodiments of the IHS, the out-of-band communications are isolated from the operating system of the IHS and the in-band communications are supported by the operating system of the IHS. In certain additional embodiments of the IHS, the container is a virtual environment providing access to enterprise data. In certain additional embodiments of the IHS, the trusted resource is an embedded controller installed on the IHS. In certain additional embodiments of the IHS, the embedded controller is a BIOS controller installed on the IHS and the trusted resource is a computing environment operating on the BIOS controller. In certain additional embodiments of the IHS, the trusted resource is a computing environment operating on the embedded controller and wherein the computing environment is configured, on behalf of the trusted agent, to verify the authenticity of the digital signature and decrypt the secured container using the symmetric key. In certain additional embodiments of the IHS, the program instructions included in the system memory further cause the one or more processors to receive the public validation key via in-band communications. In certain additional embodiments of the IHS, the trusted agent accesses the symmetric key in the secured storage via an out-of-band communication that is isolated from the operating system of the IHS. In certain additional embodiments of the IHS, the trusted resource is further configured to validate the integrity of the trusted agent prior to providing access to the symmetric key in secured storage.

Various additional embodiments provide methods for migrating a secured container from a first IHS to a second IHS, where the methods include: encrypting, at the first IHS, the secured container using a symmetric migration key; encrypting, at the first IHS, the migration key and a list of allowed migration hosts; transmitting the encrypted migration key and the encrypted list of allowed migration hosts from the first IHS to a verifying authority; transmitting the encrypted secured container from the first IHS to the second IHS; receiving, at the second IHS, the migration key from the verifying authority upon authentication of the second IHS by the verifying authority and upon confirmation the second IHS is identified in the list of allowed hosts; and decrypting, at the second IHS, the secured container using the migration key.

In certain additional embodiments of the method for migrating a secured container, the migration key and a list of allowed migration hosts are encrypted using a public key of the verifying authority. In certain additional embodiments of the method for migrating a secured container, the transmissions by the first IHS and the second IHS to the verifying authority are digitally signed. In certain additional embodiments, the method for migrating a secured container further includes launching the secured container on the second IHS. In certain additional embodiments of the method for migrating a secured container, the secured container is a virtual machine.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
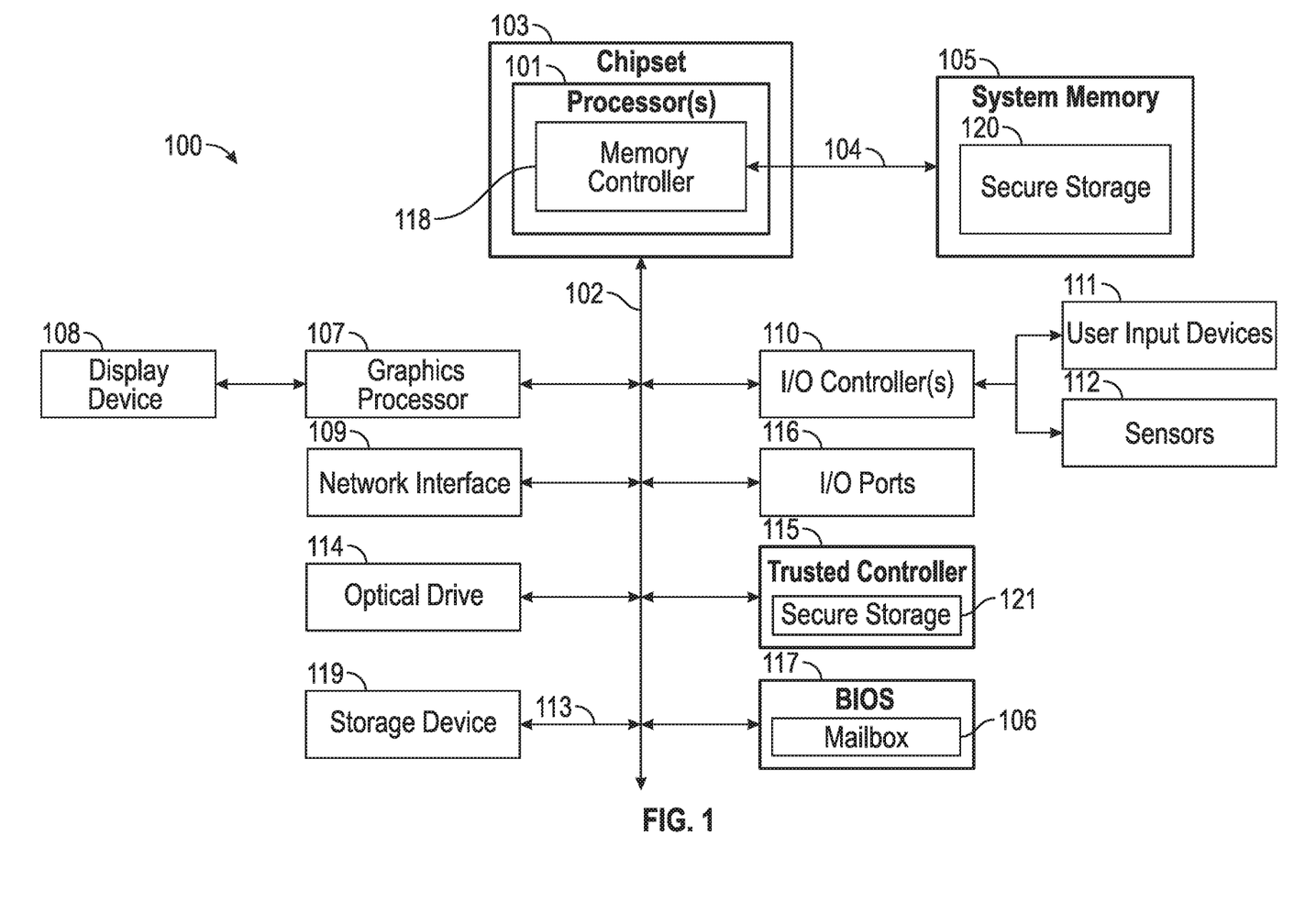
FIG. 1 is a block diagram depicting certain components of an IHS configured according to various embodiments to host a secure container.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 illustrates certain components of an IHS 100 configured according to certain embodiments to receive and host a secure container, such as a secure virtual environment that may provide the user of IHS 100 with access to enterprise data while isolating the enterprise data from the operating system of the IHS 100. As described in additional detail with regard to the FIGS. 2-5, a secure container may be configured remotely and deployed to IHS 100 in a secure manner utilizing trusted resources installed on IHS 100. In various embodiments, IHS 100 may execute program instructions that cause IHS 100 to perform certain of the operations disclosed herein. While a single IHS 100 is illustrated in FIG. 1, IHS 100 may be a component of an enterprise system that may include any number of additional IHSs that may also utilize the described secured containers in the same or similar manner to IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory.

In certain embodiments, system memory 105 includes a secure storage 120 that may be a portion of the system memory designated for storage of information, such as access policies, component signatures, encryption keys and other cryptographic information, for use in hosting a secure container on IHS 100. In such embodiments, a signature may be calculated based on the contents of the secure storage 120 and stored as a reference signature. The integrity of the data stored in the secure storage 120 may then be validated at a later time by recalculating this signature of the contents of the secure storage and comparing the recalculated signature against the reference signature.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 108 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, the network interface 109 may support connections between a trusted IHS component, such as trusted controller 115, and a remote secure container service 345, such as described with regard to FIG. 3. In such embodiments, a connection supported by the network interface 109 between the remote secure container service 345 and the trusted component may be considered an out-of-band (OOB) connection that is isolated from the operating system of the IHS.

Chipset 102 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 may include HDMI (High-Definition Multimedia Interface) ports for use in connecting external display devices to IHS 100 and USB (Universal Serial Bus) ports, by which a variety of external devices may be coupled to IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiments, BIOS 117 includes a predefined memory or memory region that may be referred to as a NVM (Non-Volatile Memory) mailbox 106. In such embodiments, the mailbox 106 may provide a secured storage location for use in storing workspace access policies, signatures, cryptographic keys or other data utilized to host and validate a secure container on IHS 100. In certain embodiments, the BIOS mailbox 106 may be utilized as a secure storage utilized by a remote secure container service 345 in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, a trusted controller 115 is coupled to IHS 100. In certain embodiments, the trusted controller 115 is an embedded controller that is installed as a component of the motherboard of IHS 100. In various embodiments, the trusted controller 115 may perform various operations in support of the delivery and deployment of a secured container to IHS 100. In certain embodiments, trusted controller 115 may interoperate with a remote secured container service via an out-of-band communications pathway that is isolated from the operating system that runs on IHS 100. In certain embodiments, network interface 109 may support such out-of-band communications between trusted controller 115 and a remote secured container service. In certain embodiments, trusted controller 115 may receive cryptographic information required for secure delivery and deployment of a secured container to IHS 100. In such embodiments, the cryptographic information may be stored to a secured storage 121 maintained by the trusted controller 115. In certain embodiments, trusted controller 115 may support execution of a trusted operating environment that may support cryptographic operations used to deploy a secured container on IHS 100. In certain embodiments, trusted controller 115 may support deployment of a secured container within the operating system of IHS 100 via an out-of-band communications channel that is isolated from the operating system and allows the trusted container 115 to communicate with a trusted agent process of the operating system.

In certain embodiments, trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such a hash value may be maintained in the secure storage 121 as a reference signature. The trusted controller 115 may be further configured to recalculate a hash value at a later time for such a component. The hash value recalculated for the component may then be compared against the reference hash value signature in order to determine if any modifications have been made to a component, thus indicating the component has been compromised. In this manner, the trusted controller 115 may be used to validate the integrity of hardware and software components installed on IHS 100. In certain embodiments, the remote secured container service may verify the integrity of the trusted controller 115 in the same manner, by calculating a signature of the trusted controller 115 and comparing it to a reference signature calculated during manufacture of IHS 100. In various embodiments, one or more of these operations supported by trusted controller 115 may be implemented using BIOS 117.

In various embodiments, an IHS 100 does not include all of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the processor 101 as systems-on-a-chip.

Figure 2:
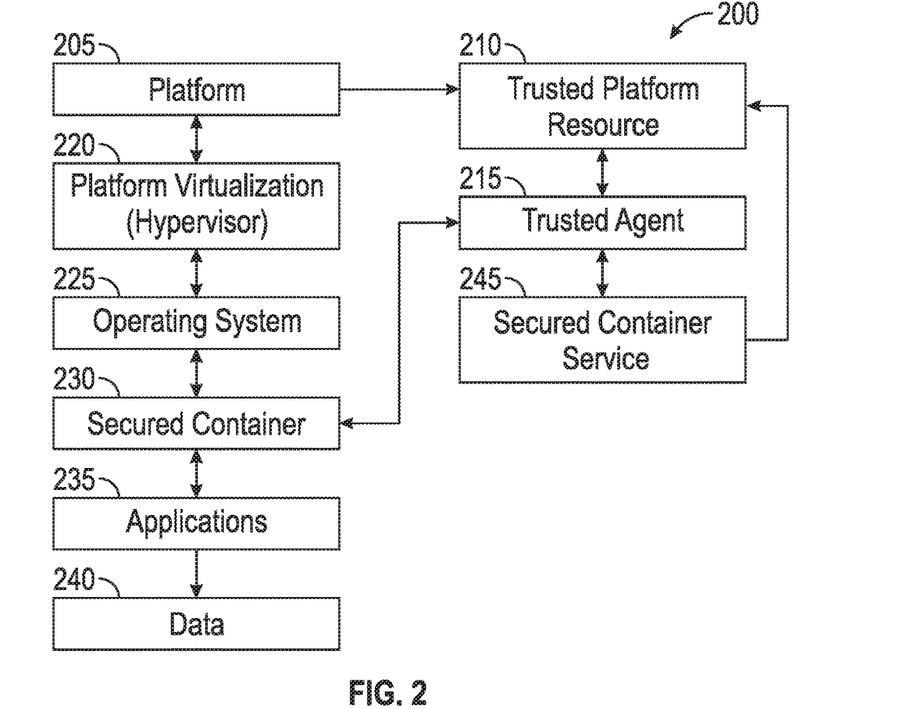
FIG. 2 is a block diagram depicting certain components of a system configured according to various embodiments to deliver and deploy a secure container.

FIG. 2 is block diagram illustrating certain components of a system 200 implementing a secure container 230 according to various embodiments. As illustrated, at one end of the system 200 is the platform 205 from which a user will be accessing a secure container 230, which may in turn provide access to secure data 240 and secure applications 235. In certain embodiments, the platform 205 may be implemented by the hardware, firmware and software of an IHS, such as IHS 100 described with respect to FIG. 1. Accordingly, platform 205 may be a personal computing device, such as a laptop, desktop, tablet, 2-in-1 convertible device, or a smart phone, capable of interfacing with an enterprise system and hosting a secure container 230.

Platform 205 includes one or more trusted platform resources 210 that support the delivery and deployment of a secured container to the IHS. For instance, as described with regard to FIG. 1, an IHS 100 may implement one or more secured storages, such as a designated secured memory area of the system memory 105, a mailbox storage of BIOS 117, and/or a secured storage 121 of a trusted controller 115. Also as described, trusted controller 115 and/or BIOS 117 may implement an operating environment that supports operations for secured delivery and deployment of a secured container 235 on platform 205. The remote secured container service 245 may access the trusted platform resource 210 via out-of-band communications that are isolated from the operating system 225 running on platform 205.

In the embodiment of FIG. 2, platform 205 supports a platform virtualization layer 220, which may be referred to in certain scenarios as a hypervisor. The platform virtualization layer 220 allows multiple virtual machines to run concurrently on platform 205, where each virtual machine may host a different instantiated operating system 225. The hypervisor 220 provides a virtual machine container that presents a logical hardware interface to the operating system(s) 225 installed on platform 205. By utilizing a platform virtualization layer 220, multiple different operating systems 225 may run concurrently on a single platform 205, while isolating the operating system 225 from the hardware and firmware used to implement platform 205. In certain scenarios, an individual virtual machine may be regarded as a secured container that may be delivered, deployed and migrated between platforms according to the embodiments described herein.

In certain scenarios, the system 200 of FIG. 2 may be a component of an enterprise computing system by which an enterprise may provide users with controlled access to secured data 240 via one or more software applications 235 within a secured container 230. In certain scenarios, one or more of the software applications 235 installed on platform 205 may be secured such that user are provided with controlled access to these software applications based on specifications provided in policies that may be enforced upon launching secured container 230 and periodically during operation of the secured container 230.

In the illustrated embodiment, users are provided access to secured data 240 and/or secured software applications 235 via a secured container 230 provided within an operating system 225 installed on platform 205. The secured container 230 may include tools and resources necessary for a particular user to access secured data 240 and/or a secured application 235 according to policies that specify restrictions on the user's access. In this manner, an enterprise user may be provided with access to enterprise data and the tools necessary for user to perform job functions involving enterprise data or applications, thus promoting the user's productivity, while maintaining the secured data 240 and/or secured software application 235 protected within the secured container 230. In various embodiments, a secured container 230 may include only data 240, or may include both data 240 and applications 235, or may include an operating environment, such as a secured workspace, for performing various tasks using provided data 240 applications 235.

Certain embodiments may utilize a trusted agent 215 that operates as a trusted resource operating within the operating system 225 of platform 205. The trusted agent 215 may receive information for configuring secured container 230 from secured container service 245. In certain scenarios, the secured container service may transmit secured container 230 as an encrypted and signed component that is received by the trusted agent 215. In certain embodiments, trusted agent 215 decrypts and validates secured container 230 based on cryptographic information retrieved from trusted platform resource 210 via an out-of-band communication that is isolated from the operating system 225.

Figure 3:
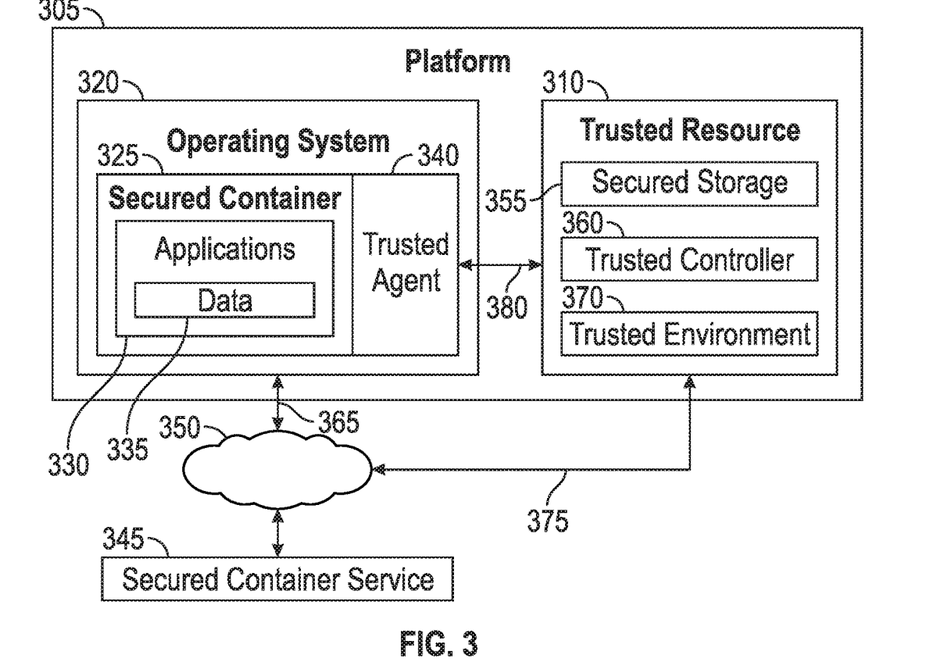
FIG. 3 is a block diagram depicting certain components of a system configured according to various embodiments to deliver and deploy a secure container.

FIG. 3 depicts certain components of a system for hosting a secured container 325 on a platform 305, where the secured container 325 may be delivered and deployed on platform 305 from a remote secured container service 345. As with the system of FIG. 2, platform 305 may correspond to an IHS such as IHS 100 described with regard to FIG. 1. Platform 305 may include a trusted resource 310 utilized by the remote secured container service 345 in delivering and deploying the secured container 325 on platform 305. The remote secured container service 345 may utilize both out-of-band communications 375 with the trusted resource 310 and in-band communications that are supported by the operation system 320 of the platform 305 in delivering and deploying a secured container 325 on platform 305.

In certain embodiments, the secured container 325 may be launched on platform 305 via the operation of a trusted agent 340 configured to communicate securely 380 with the trusted resource 310. The trusted agent 340 may utilize encrypted messaging to communicate with secured container service 345 in isolation from operating system 320. As described with regard to FIG. 4, the secured container service 345 may utilize out-of-band communications 375 to store cryptographic information, including a private key unique to platform 305, to a secured storage 355 on platform 305. The trusted agent 340 may be configured to access the secured storage 355 via a communications channel 380, that allows communications in isolation from the operating system 320. For instance, the trusted agent 430 and the trusted resource 310 may be provided with a shared secret via secured communications with the remote secured container service 345. The shared secret may be used to establish secure TLS (Transport Layer Security) communications sessions between the trusted agent 340 and the trusted resource 310. In certain embodiments, one or both of the trusted agent 340 and the trusted resource 310 may be configured with the shared secret during manufacture of the platform 305. Using this out-of-band communication channel 380 with the trusted resource 310, the trusted agent 340 may retrieve the private key from secured storage 355.

In certain embodiments, the trusted resource 310 may require validation of the integrity of the trusted agent 340 prior to allowing access to secured storage 355. For instance, trusted controller 360 may generate a signature of the current operating state of the trusted agent 340 for comparison against a reference signature for the trusted agent. If this validation process indicates the trusted agent 340 has not been compromised, the trusted controller 360 may provide the trusted agent 340 with access to the private key for use in secure communications with the secured container service 345. In order to continually safeguard against the trusted agent 340 being compromised, the trusted agent 340 may be periodically re-validated by the trusted controller 360.

In certain embodiments, the trusted resource 310 may include a trusted operating environment 370 that may implement various operations for use in delivering and deploying a secured container 325 on platform 305. For instance, a trusted operating environment 370 may implement certain cryptographic functions used to deploy the secured container 325 while the cryptographic secrets, such as private symmetric keys required to decrypt a secured container, remain stored in secured storage 355. The trusted operating environment 370 may also implement operations for validating digital signatures, such as the signed container received from the secured container service 345. The trusted environment 370 may also implement the out-of-band communications 375 with the remote secured container service 345 and the out-of-band communications 380 with the trusted agent 340. In certain embodiments, the trusted operating environment 370 may implement various of the integrity validations of components of the IHS described herein. In certain embodiments, the trusted operating environment 370 may run on a trusted controller 360 that is an embedded controller installed on the motherboard of platform 305. In certain other embodiments, the trusted operating environment 370 may run on an embedded controller that implements the BIOS of platform 305, such as the BIOS 117 of FIG. 1.

As illustrated in FIG. 3, the trusted resource 310 communicates with the remote secured container service 345 via a network 350, such as the Internet, via a separate communication pathway 375 than the in-band pathway 365 utilized by the operating system 320 to communicate with the remote secured container service 345. In this manner, the remote secured container service 345 may utilize out-of-band communications in delivering cryptographic data and other resources to support secure deployment of the secured container 325, where these out-of-band communications are independent of operating system 320. In scenarios where the operating system 320 or applications running within operating system 320 have been compromised, controls that restrict access to secured container 325, and the enterprise data accessed via the secured container 325, remain in place due to the isolation of the container security measures from the compromised operating system 320.

Figure 4:
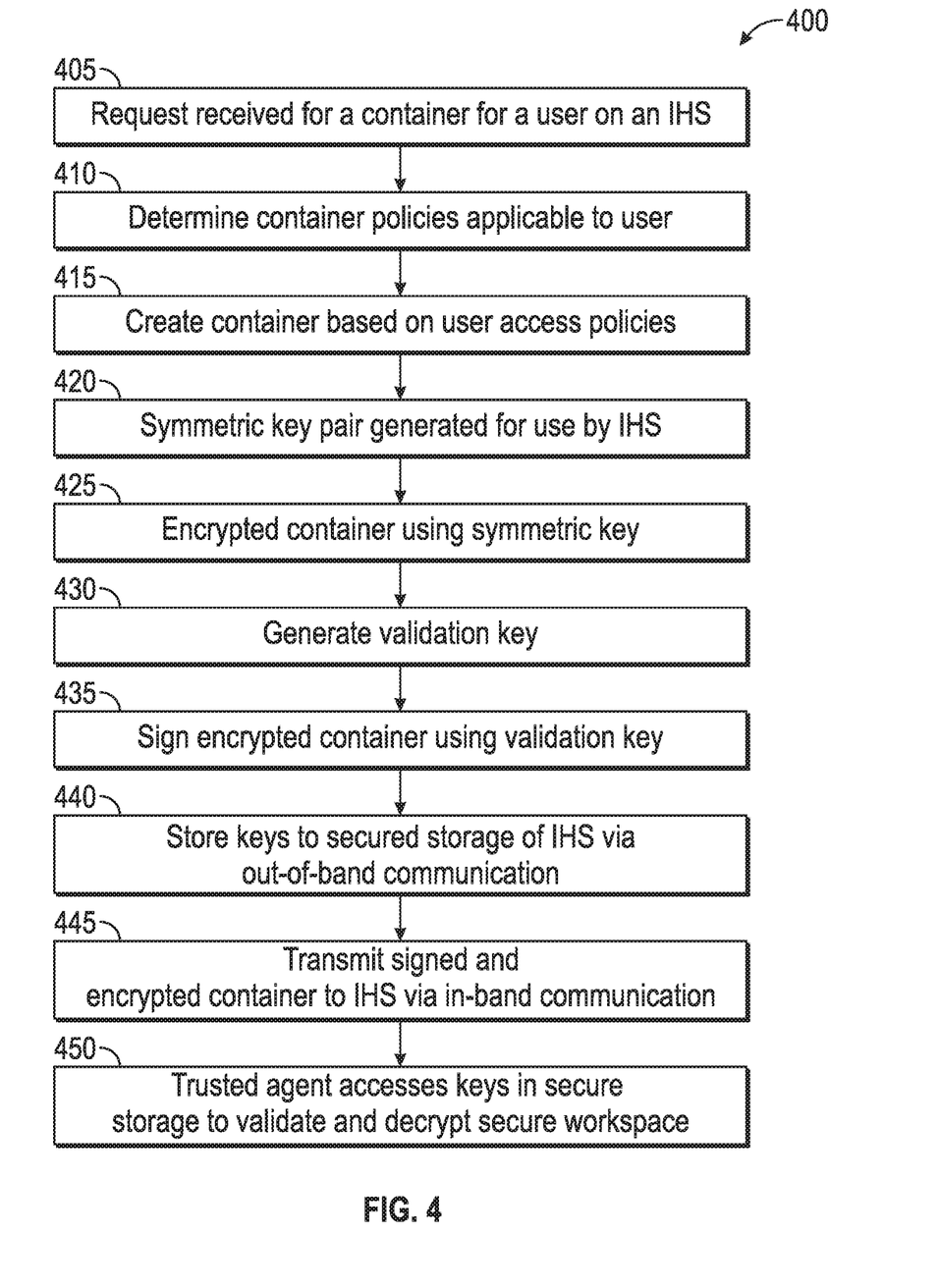
FIG. 4 is a flowchart diagram depicting certain steps of a process for delivering and deploying a secure container according to various embodiments.

FIG. 4 illustrates certain steps of a process according to various embodiments for delivering and deploying a secured container on an IHS. In certain embodiments, the IHS hosting the secured container may be similar in various respects to IHS 100 of FIG. 1, platform 205 of FIG. 2 and/or platform 305 of FIG. 3. In the illustrated embodiment, the process begins at step 405 with the receipt of a request for the deployment of a secured container on a particular IHS. In certain embodiments the request may be received by a service that is remote from the IHS and configured to provide delivery and deployment of a secured container, such as the secured container service 245 of FIG. 2 and/or secured container service 345 of FIG. 3.

In certain scenarios, the request for a secured container may specify a particular individual for which the secured container will be configured by the secured container service. The request for the secured container may also provide a unique identifier associated with the IHS on which the secured container is to be hosted. In certain embodiments, the secured container request may be received from the IHS, such as via a request generated by a user through a graphical interface provided within the operating system of the IHS. In other embodiments, the secured container request may be generated by default according to startup procedures implemented by IHS. For instance, upon a user logging into IHS, the initialization of the IHS for that user may include issuing a request for one or more secure containers that provide access to enterprise data required for the user's regular job functions.

At step 410, information provided in the secured container request may be utilized in configuring the secured container. Policies applicable to the secured container may be determined based on the user specified in the request. For instance, a particular user may require access to certain secured applications and enterprise data in order to perform regular job functions and may be granted access to additional secured applications and data upon specific request. The identity of the user specified in the secured container request may be used to identify any such policies applicable to the configuration of the secured container. The applicable policies may also be determined based on the IHS that will be hosting the secured container. For instance, the job functions of a particular user may require providing the user with default access to certain secured data via a secured container. However, such a secured container may only be provided to a user while they are operating a particular IHS, such as an issued laptop computer. In another scenario, a secured container with reduced access to enterprise data may be provided to a user while they are operating on a less secured IHS, such as a smart phone. Based on the applicable policies, at step 415, the container is configured and created, such as by the remote secured container service.

Before delivery of the configured secured container to the IHS, at step 420, a symmetric key is generated for encryption of the secured container. In certain embodiments, a unique symmetric key may be generated for every IHS that is supported by secured container service. As described, the request for a secured container may provide a unique identifier for the IHS on which the secured container will be hosted. In certain embodiments, the unique IHS identifiers received in secured container requests may be used to track the symmetric keys generated and assigned to each IHS. Each supported IHS may thus be identified by a unique key. The secured container service may identify a particular IHS as being compromised by detecting the use of that particular IHSs symmetric key in a communication by a different IHS. At step 425, the configured container may be encrypted using the symmetric key.

At step 430, a validation key may be generated for signing the encrypted secured container. In certain embodiments, the validation key may be an asymmetric key pair that includes public and a private key. At step 435, the encrypted container is signed using the validation key. For instance, a digital signature may be generated based on the encrypted container and the private validation key. In certain scenarios, the encrypted container may be hashed or otherwise processed to generate a digest that is used along with the private validation key to generate a digital signature.

In order for the signed and encrypted secured container to be deployed on the IHS, at step 440, the secured container service stores the required cryptographic information to the secured storage provided by a trusted resource of the IHS. As described, an IHS may be configured to include a trusted platform resource that operates in isolation from the operating system of the IHS. In addition, the secured container service may communicate with the trusted resource of the IHS via out-of-band communications that are also isolated from the operating system of the IHS. At step 440, the private symmetric key used for encrypting the secured container is stored to a secured storage on the IHS via an out-of-band communication. In certain embodiments, additional cryptographic information used to support the secured container, such as the public validation key, may also be stored to the secured storage of the IHS.

At step 445, the signed and encrypted secured container is transmitted to the IHS by the secured container service. With the secured container being both encrypted and digitally signed, the secured container may be transmitted to the IHS via in-band communications, such as via communication interfaces supported by the operating system of the IHS. As described, certain embodiments may utilize the communications supported by the operating system to communicate with the trusted agent running within the operating system of the IHS. In such embodiments, the trusted agent may receive the signed and encrypted secured container transmitted by the remote secured container service. In certain embodiments, cryptographic information, such as the public validation key, may be included in the transmission of the signed and encrypted secured container.

At step 450, the trusted agent utilizes the cryptographic information provided via the in-band communication and the out-of-band communication to securely deploy the container on the IHS. For instance, the trusted agent may utilize the public validation key provided via in-band communications to validate the authenticity of the signature provided with the encrypted secured container by the secured container service. As described, the trusted agent may be configured to utilize an out-of-band communication channel to access the trusted platform resource to which secret cryptographic information, such as the private symmetric encryption key, has been stored. The trusted agent may access the private symmetric encryption key from the trusted platform resource in isolation from the operating system. Using the private symmetric encryption key, the trusted agent may decrypt the secured container, thus making the secured container ready for deployment on the IHS.

Figure 5:
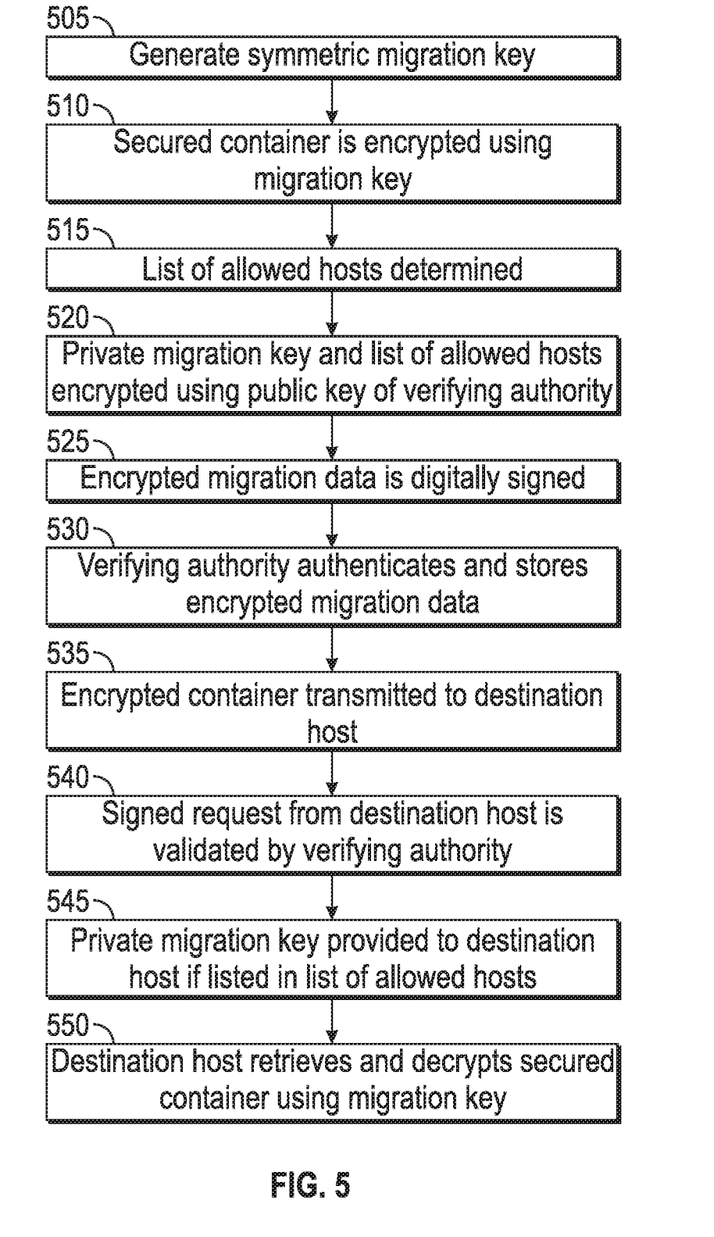
FIG. 5 is a flowchart diagram depicting certain steps of a process according to various embodiments for migrating a secured container between hosts.

FIG. 5 is a flowchart diagram depicting certain steps of a process according to various embodiments for migrating a secured container from a first IHS to a second IHS via an intermediary trusted verifying authority. In the illustrated embodiment, the process begins at step 505 with first IHS generating a symmetric encryption key to be used for migration of the container from the first IHS to the second IHS. As described, in various embodiments, a container be a secured virtual environment or a virtual machine that operates on IHS and provides access to secured enterprise data. At step 510, the first IHS uses the private migration key to encrypt the container to be migrated.

A list of allowed migration hosts may be determined at step 515. In certain embodiments, the list of allowed migration hosts may be a listing of IHSs that have been authorized as hosts for the secured enterprise data provided via the container. In certain embodiments, the list of allowed migration hosts may be provided to the first IHS by the enterprise system in response to a query from the first IHS, where the list of allowed migration host may be determined based on the policies applicable to the enterprise data that is accessed via the container to be migrated.

At step 520, the private migration key and the list of allowed hosts may be encrypted by the first IHS in order to transmit this migration data to a verifying authority. In certain embodiments, the first IHS may also generate and include a nonce in the migration data that is encrypted for transmission, thus reducing the risk of the migration data transmission to the verifying authority being intercepted and misused via replay attacks. In certain embodiments, the migration data may be encrypted using a public key associated with verifying authority. In certain embodiments, the verifying authority is a component of the enterprise system that supports migration of secured containers between authorized IHSs. The verifying authority may be associated with a digital certificate that provides the public key used by the first IHS in the encryption of the migration data transmitted to the verifying authority.

In certain embodiments, at step 525, the first IHS may digitally sign the encrypted migration data to be transmitted to the verifying authority. In such embodiments, the first IHS may sign the migration data using a private key from a digital certificate associated with the first IHS. The signed and encrypted migration data may then be transmitted to the verifying authority. At step 530, the verifying authority receives migration data. The verifying authority may utilize a public key from the digital certificate of the first IHS to authenticate the digital signature provided with the encrypted migration data. The verifying authority also stores the migration data, including both the list of allowed migration hosts and the private migration key. In addition to transmitting the migration data to the verifying authority, the first IHS transmits the encrypted container to the second IHS at step 535.

Upon receiving the encrypted container, the second IHS may issue a signed request to the verifying authority for the migration key necessary to decrypt the encrypted container. At step 540, the verifying authority evaluates such requests for access to an encrypted container. The verifying authority may utilize a public key from a digital certificate associated with the second IHS to authenticate the request for access to the migration data. The verifying authority may also determine whether the second IHS is an authorized host for the secured container based on the list of allowed hosts received in the migration data. If the second IHS is determined to be authenticated and an allowed host for the secured container, the private migration key is provided, at step 545, to the second IHS via a secured communication. At step 550, the second IHS utilizes the private migration key to decrypt container received from the first IHS. The container may then be launched by the second IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for migrating a secured container from a first IHS (Information Handling System) to a second IHS, the method comprising:
   encrypting, at the first IHS, the secured container using a symmetric migration key;
   encrypting, at the first IHS, the migration key and a list of allowed migration hosts;
   transmitting the encrypted migration key and the encrypted list of allowed migration hosts from the first IHS to a verifying authority;
   transmitting the encrypted secured container from the first IHS to the second IHS;
   receiving, at the second IHS, the migration key from the verifying authority upon authentication of the second IHS by the verifying authority and upon confirmation the second IHS is identified in the list of allowed hosts; and
   decrypting, at the second IHS, the secured container using the migration key.

2. The method of claim 1, wherein the migration key and a list of allowed migration hosts are encrypted using a public key of the verifying authority.

3. The method of claim 2, wherein the transmissions by the first IHS and the second IHS to the verifying authority are digitally signed.

4. The method of claim 2, further comprising launching the secured container on the second IHS.

5. The method of claim 1, wherein the secured container is a virtual machine.

* * * * *